May 22, 1962      F. X. WRIGHT      3,035,418
SELF-CONTAINED WATER-SUPPLY AND COOLING UNIT
Filed April 24, 1959      3 Sheets-Sheet 1

INVENTOR
FRANCIS X. WRIGHT
BY
Fay & Fay
ATTORNEYS

May 22, 1962 F. X. WRIGHT 3,035,418
SELF-CONTAINED WATER-SUPPLY AND COOLING UNIT
Filed April 24, 1959 3 Sheets-Sheet 3

INVENTOR
FRANCIS X. WRIGHT
BY *Fay & Fay*
ATTORNEYS

United States Patent Office 3,035,418
Patented May 22, 1962

3,035,418
SELF-CONTAINED WATER-SUPPLY AND
COOLING UNIT
Francis X. Wright, 2671 Wrenford Road,
Shaker Heights, Ohio
Filed Apr. 24, 1959, Ser. No. 808,621
7 Claims. (Cl. 62—176)

This invention, as indicated, relates to self-contained water supply and cooling units. In many areas of the world the problem of obtaining drinking water is often extremely difficult to solve. In a number of instances the supply of ground water is either extremely limited or non-existent. In sections where such is the case, it is often necessary to pipe or truck water in from sections in which it is in good supply. Although this procedure represents one solution to the problem, it is immediately apparent that tremendous expenses and inconveniences are involved in a program of this sort.

Certain other areas may have an ample amount of ground water but, by virtue of the geography of the terrain, it may be entirely too expensive to obtain, as, for example, in locations where there are considerable quantities of bed rock and the like, thus necessitating costly drilling procedures.

In some sections water may be present in abundant supply but, because of poor quality, may be either totally unusable or may require extensive processing. Localities recovering from floods and other types of disasters and localities having water with extremely high mineral contents are often faced with this problem. In some cases, the problem of water supply may be only intermittent in which case a standby source is desirable, if not necessary.

My invention offers an inexpensive solution to many of these water supply problems and is especially applicable in geographical areas normally having a high humidity or moisture content in the air. By means of my invention humid air is drawn through purifying filters and a condensing coil which removes the moisture in the air and stores it in a refrigerated reservoir for use as needed.

One object of my invention is to provide a self-contained water supply and cooling unit which removes the water from the air and stores it for drinking purposes.

Another object of my invention is to provide a self-contained water supply and cooling unit which also acts as a dehumidifier.

A still further object of my invention is to provide a self contained water supply and cooling unit which additionally acts as an air purifier.

Still another object of my invention is to provide in a water supply and cooling unit an easily serviceable filtering arrangement.

Other objects and advantages of the invention will be apparent from the detailed description which follows.

Figure 1:
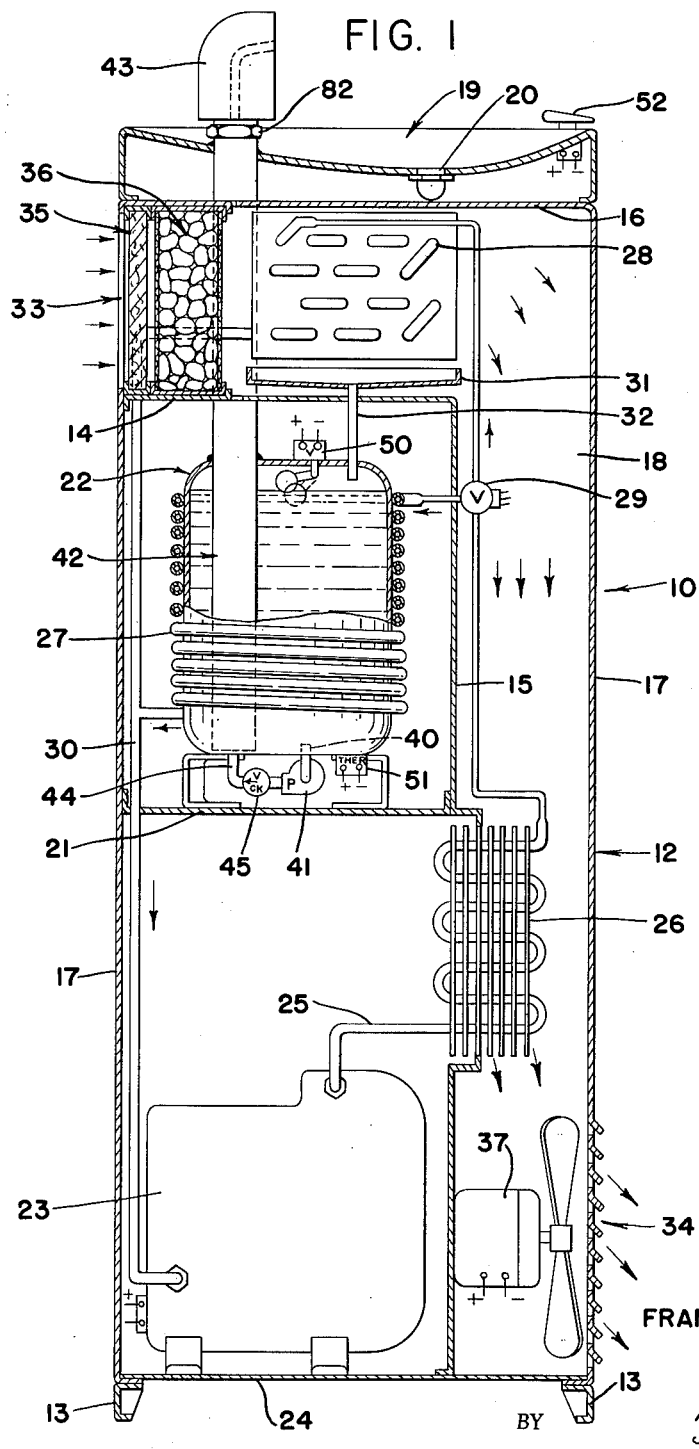
FIG. 1 is a schematic elevational view of my self-contained water supply and cooling unit, partly in longitudinal section.

Referring now more particularly to the drawings, I have shown one means by which my invention may be effectively practiced. In FIG. 1, I have illustrated the water supply and cooling unit, indicated generally as 10, as including a housing 12 of elongated configuration and provided at bottom portions thereof with legs 13 or the like. The housing 12 is provided internally thereof with a series of partitions 14 and 15, which, in cooperation with the top 16 and sides 17 of the housing, form an air conducting passageway 18 having the general shape in section of an inverted L.

Attached at the upper end of the housing 12 is a pan 19 which is smoothly downwardly sloped towards drain 20. This pan may be made from any suitable material, but I have found that stainless steel presents an extremely attractive appearance. A wall 21 is provided to support cold water reservoir 22. Compressor 23 may rest on bottom wall 24 of the housing, and connected thereto is a refrigerant supply line 25. The supply line 25 conducts gasified refrigerant to the condensing or hot coil 26, which may be mounted partially within the L-shaped, air conducting passageway 18. From the refrigerant condensing coil 26, the supply line feeds an expansion or cold coil 27, which is disposed about the water reservoir 22. The supply line additionally feeds a second expansion or cold coil 28, which is disposed within the air conducting passageway 18 in a position generally above the reservoir 22.

An electrically controlled valve 29 is employed at the point where the supply line 25 branches to feed the two expansion coils. By this means the flow of condensed refrigerant may be directed to either or both of the expansion coils, as desired. A return line 30 carries the refrigerant back to the compressor 23 after it has passed through the expansion coils 27 and 28. A drip basin 31 having a tubular member 32 depending therefrom into communication with cold water reservoir 22 is disposed generally below the expansion or cold coil 28. The housing 10 is provided at the ends of the L-shaped, air conducting passageway 18 with openings 33 and 34. The air passageway 18 is provided upstream of the expansion coil 28 with air filters 35 and 36.

A fan 37 is provided downstream from the refrigerant condensing coil 26 for drawing humid air into the unit and through the filters 35 and 36, past the expansion coil 28 and the refrigerant condensing coil 26, and for forcing the air subsequently through the lower opening or grill 34. A pump intake tube 40 extends through the bottom of a cold water reservoir 22 and is attached to the low pressure side of pump 41. The high pressure side of the pump is connected to casing 42, at the upper end of which is attached spout 43. The casing 42 contains a water filtering system which will be described in detail hereinbelow.

In the line 44 between the high pressure end of the pump and the casing 42, I employ a check valve 45 to prevent water pumped into the casing 42 from backing up into the pump 41. A water level switch 50 and a thermostat 51 are disposed in communication with the water level reservoir 22. A main switch 52 is provided to operate the pump, whereby to start and stop the flow of water to the spout 43.

Figure 2:
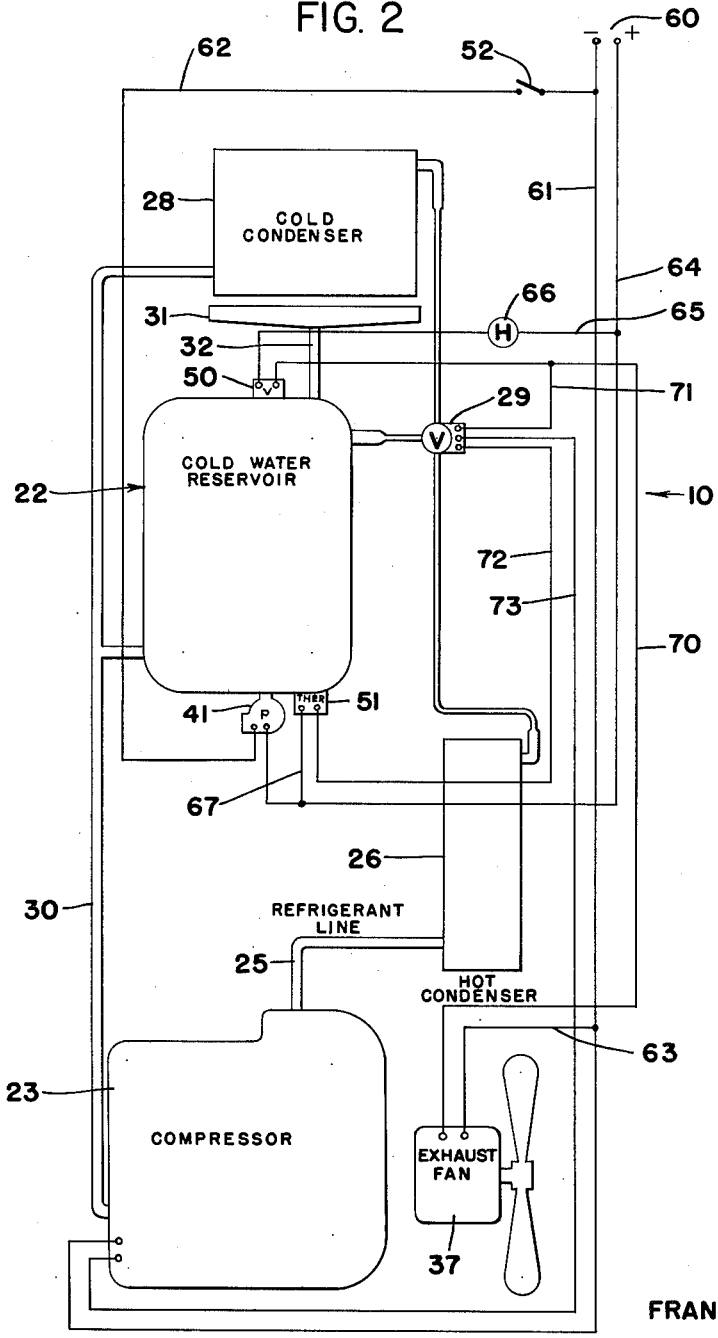
FIG. 2 is a diagram of the electrical system of my water supply and cooling unit.

In FIG. 2, I have shown a wiring diagram for the water supply and cooling unit of FIG. 1. Reference numeral 60 indicates a source of electrical energy, one pole of which is connected to line 61. Line 62 is attached to one pole of pump 41 and to line 61, thus establishing communication between the source 60 and the pump 41, subject to the action of main switch 52, which is disposed in the line 62 between the pump and the source. The said one pole of the source, in addition to being connected to pump 41 by means of line 61 and 62, is also connected by line 61 to the compressor 23 and to the exhaust fan, the latter connection being made by means of the line 63, which is attached to one pole of the fan and to the line 61. The other pole of the source 60 is connected to line 64 and, by means of line 65, to one pole of the water level switch 50, a humidistat 66 being interposed in line 65 between the points where it is attached to the water level switch and the line 64. Line 64 also establishes electrical communication between the said other pole of the source and the other pole of pump 41.

The thermostat 51 is connected to the said other pole of the source by means of line 67, which is attached to one pole of the thermostat and to the line 64, between the pump 41 and the source. The other poles of the fan 37 and the water level switch 50 are in electrical communication with each other by means of line 70, which is connected therebetween. One contact of the electrically controlled valve 29 is connected to the fan 37 and the water level switch by means of line 71. Another contact of the valve 29 is connected to the other pole of the thermostat by means of line 72, and the third contact of the valve is attached by means of line 73 to the other pole of the compressor 23. The operation of these circuits and of the mechanical components of the water supply and cooling unit will be described in due time.

Figure 3:
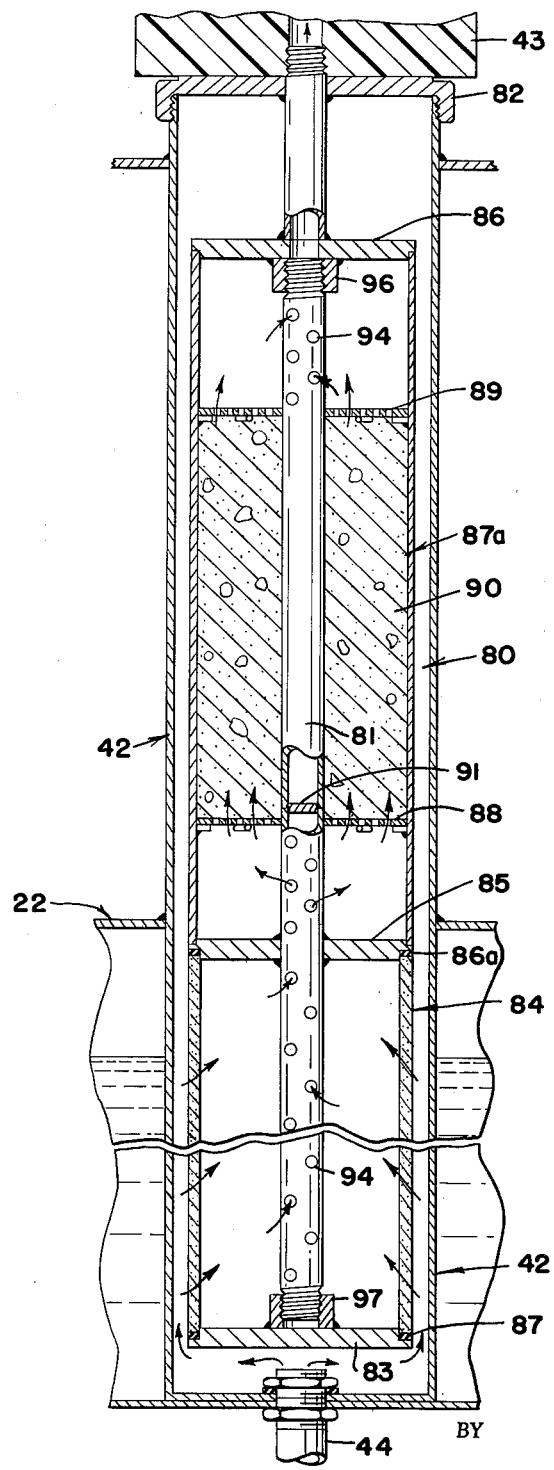
FIG. 3 is an enlarged elevational view, partly in longitudinal section, of the water filtering system.

Referring now to FIG. 3, I have shown one of the preferred forms which the water filtering system of the supply and cooling unit may take. The cold water reservoir 22 is provided with a hollow casing 42, which may be offset from the center of the reservoir and which may be connected at one end to the pan 19 and at the other end to the reservoir 22 by any convenient means. Line 44 from the high pressure side of the pump is attached to the bottom of the casing.

Hung within the casing is a filter column indicated generally as 80. The filter column 80 includes a central tubular member 81, which communicates at its upper end with spout 43. This spout, I have found, presents an attractive appearance if made from a generally transparent material. The spout 43 may rest upon a nut 82 fixed near the upper end of the central tube 81 and connected by threads or the like to the casing 42.

Connected to the lower end of the tube 81 is a flange member or the like 83. A shell-like filter 84, which may be made from ceramic material if desired, rests on upper portions of the flange member 83. A flange 85 is attached to the central tubular member 81 at a position spaced above the flange 83, the filter element 84 being carried between the flanges 83 and 85. Gaskets 86a and 87 may be employed between the ends of the filter 84 and the flanges 83 and 85. A further flange 86 is attached to the central tubular member 81 at a position spaced above the flanges 83 and 85, and carried between the flanges 85 and 86 is another filter element designated generally as 87a.

Spaced inwardly from the ends of the filter element 87a are a pair of porous screens 88 and 89. Between these screens is carried filtering material 90, which may be of carbon or the like. The central tubular member 81 is blocked off at 91 above the lower screen 88. A plurality of apertures 94 are formed in the central tubular element 81 below the lower screen 88 and above the upper screen 89. The central tubular element 81 may be provided with a series of strategically located threaded joints or the like 96 and 97 to allow it to be disassembled for the purpose of filter replacement. The flange 82 is provided with external tool engaging surfaces so that it may be threaded away from the casing 42. By this construction, when it is desired to service the filters, the flange 82 in the casing 42 need merely be unscrewed, thus permitting the entire filter assembly to be longitudinally removed from the casing 42.

The general manner in which the unit disclosed in this application operates is that humid air is drawn through purifying filters 35 and 36 and past cold coil 28 under the influence of fan 37. The moisture in the air is condensed by coil 28 and flows into refrigerated reservoir 22. Dry purified air is blown outwardly through aperture or grill 34. When switch 52 is operated, water stored in the reservoir 22 is pumped through the spout 43 by means of the pump 41. Air passing through the passageway 18 and over the coils 26 aids in keeping these coils cool.

The more specific aspects of the operation of the water supply and cooling unit will be better understood from the detailed description of operation to follow. Assuming that the humidity of the air is sufficiently high to hold the humidistat 66 closed and that the water level in the reservoir 22 is sufficiently low so that the water level switch 50 is closed, electrical energy will pass through lines 64 and 65, through the humidistat 66 and the water level switch 50. From the water level switch 50, electrical energy will pass through line 70 to the valve 29 and to the exhaust fan 37. Energy supplied through line 61 will be conducted to fan 37 and compressor 23. Assuming that the temperature of the water in the reservoir 22 lies within the proper range, the thermostat 51 will complete the circuit by means of lines 72 and 67 and the compressor 23 and exhaust fan 37 will operate.

The compressor 23, while operating, forces gaseous refrigerant through supply line 25 to refrigerant condensing coil 26, which causes the gaseous refrigerant to cool and liquify. The liquified refrigerant passes through valve 29 to expansion coils 27 and 28. The refrigerant passing through coil 27 removes heat from the water in reservoir 22, thereby cooling the same, and subsequently passes into return line 30 and completes its route back to the compressor 23. The refrigerant in coil 28 lowers the temperature of the air drawn through the cleaning filters 35 and 36 and through the coil under the influence of fan 37, after which the refrigerant from coil 28 also passes into the return line 30 and is fed back to the condenser 23. As the air passing through the coil 28 is cooled, the moisture therein is condensed and flows into drip basin 31, where by means of depending tube 32 it is conducted into the cold water reservoir 22. After passing through the coils 28, the clean dry air is forced through the refrigerant condensing coil 26, thereby cooling the same, and out through the grill or opening 34.

When it is desired to remove water from the reservoir 22 for drinking purposes, the switch 52 is thrown, thereby closing the circuit to the pump 41. The pump starts, thereby drawing water through the tube 40 and the pump 41 and forcing it through check valve 45 and tube 44 into casing 42, as indicated by the arrows in FIG. 3. This water is then forced upwardly between the inside wall of the casing 42 and the outside wall of the hollow filter 84. The hollow filter 84, being porous, allows the water to pass therethrough to its interior, where it flows through the lower apertures 94 formed in the central tube 81. Obviously, any water which flows upwardly beyond flange member 85 must do so through the tube 81. Because of the plug member 91, the flow of water is subsequently directed out of the tube 81 and into the chamber formed between the flange 85 and the lower screen 88. The lower screen 88 allows the water to pass upwardly into and through the filter element 90, after which it passes upwardly through the upper screen 89 and, because of the flange 86, through the upper apertures 94 back into the interior of the tube 81 and up through the spout 43.

When it is desired to stop the flow of water to the spout 43 the switch 52 is opened, thereby breaking the pump circuit. Check valve 45 prevents water contained within the casing 42 from backing up into the pump. In the event that the humidistat 66 indicates that the moisture content of the air is not sufficiently high or in the event that the water level switch 50 indicates that the water in the reservoir 22 has reached a desired level, the circuit to the fan is broken, thereby stopping the same. In addition, the valve 29 is operated to halt the flow of refrigerant to the cold coil 28. The compressor 23 may continue to run, thereby supplying refrigerant to the cold coil 27, depending on whether or not the thermostat 51 indicates that the temperature of the water in the reservoir 22 has been brought within the desired range.

When the temperature of the water in the reservoir has been brought to the desired level, the thermostat 51 will break the compressor circuit, thereby stopping the operation of the compressor. At this same time, the electrical valve 29 operates to stop the flow of refrigerant to cold coil 27. In the event that the thermostat 51 indicates that the temperature of the water in the reservoir 22 lies within desired range while at the same time the humidistat 66 indicates that the moisture content in the air is sufficiently high and the water level switch 50 indicates that the amount of water in the reservoir 22 is below a desired amount, the compressor will start and the valve 29 will open to a position whereby refrigerant is fed to the cold coil 28, but not to the cold coil 27. Fan 37 will also operate at this time to draw air through the cold coil 28, thereby causing the moisture to condense and flow into the reservoir 22 until the desired water level is reached.

From an examination of the foregoing description, it can be seen that I have, by means of my novel water supply and cooling unit, provided a practical and economical solution to the problem of drinking water supply. This solution is of especial applicability in sections subject to high humidities. It will be apparent that, in addition to the water supply and cooling functions carried out by the instant invention, the additional functions of dehumidification and air purification are also performed.

For purposes of simplicity, I have limited the description of my invention to a single illustrated embodiment. It will be immediately apparent, however, that numerous modifications of the illustrated embodiment would occur to one possessing but ordinary skill in the art, such modifications nevertheless falling within the intended scope and spirit of the invention. For example, certain other types of refrigerating and control systems could be employed. The locations of various of the components could be rearranged or a number of alterations could be made in the water filtering system. It is therefore not my intention to be limited to the illustrated embodiment, but only by the spirit and scope of the appended claims.

I claim:

1. A self-contained water supply and cooling unit including housing means, a refrigerating system in said housing and including cold coil means, an air passageway in said housing in communication with said cold coil means, reservoir means in said housing means to draw moist air through said passageway past said cold coil means thereby to condense the moisture from said air, means to conduct the condensed moisture to said reservoir, means in communication with said reservoir for drawing moisture therefrom, water level switch means in water level sensing relationship with said reservoir, thermostat means in temperature sensing relationship with said reservoir, humidistat means in moisture sensing relationship with the air, and electrical circuit means for causing intermittent operation of said refrigerating system in response to signals from said switch, thermostat and humidistat means.

2. A device as defined in claim 1 in which the means for drawing moisture from the reservoir includes pump means.

3. A device as defined in claim 1, including air filter means disposed in said passageway.

4. Structure as defined in claim 1 in which said means for drawing moisture from said reservoir includes a casing extending from said reservoir through the wall of said housing, a water filter column removably disposed in said casing, a spout disposed at the end of said column in fluid conducting relationship therewith, and means to force water through said column, said column comprising a unitary assembly and being longitudinally removable from said casing as a unit.

5. A device as defined in claim 1 further characterized by the provision of electrical circuit means for causing, in response to signals from said water level switch means, thermostat and humidistat means, intermittent operation of said means for drawing moist air through said passageway.

6. Structure as defined in claim 1 in which the means for drawing moisture from the reservoir includes a substantially straight tubular casing having one end disposed in the reservoir and the other end extending through the wall of the housing, a liquid filter column loosely received in the casing, said liquid filter column comprising a unitary assembly and being longitudinally removable from the tubular casing as a unit in a direction outwardly of the housing, spout means attached to the casing at said other end thereof in fluid conducting relationship with the liquid filter column, and means to force liquid from the reservoir into the casing and subsequently through the filter column and spout.

7. Structure as defined in claim 4 characterized by the provision of pump means having a low pressure side connected to said reservoir and a high pressure side connected to said casing for drawing moisture from said reservoir and forcing the same progressively through said water filter column and said spout.

References Cited in the file of this patent

UNITED STATES PATENTS

| | | |
|---|---|---|
| 1,065,442 | Giessel et al. | June 24, 1913 |
| 1,928,344 | Wiggenhorn | Sept. 26, 1933 |
| 2,259,541 | Ballard | Oct. 21, 1941 |
| 2,409,624 | Granville | Oct. 22, 1946 |
| 2,529,781 | Morrison | Nov. 14, 1950 |
| 2,581,125 | Morrison | Jan. 1, 1952 |
| 2,627,669 | Candor | Feb. 10, 1953 |
| 2,677,253 | Lee | May 4, 1954 |
| 2,761,292 | Coanda | Sept. 4, 1956 |
| 2,781,648 | Lyman | Feb. 19, 1957 |
| 2,805,560 | Beresford | Sept. 10, 1957 |